(12) United States Patent
Jacala et al.

(10) Patent No.: US 10,156,142 B2
(45) Date of Patent: Dec. 18, 2018

(54) SYSTEMS AND METHODS FOR PRODUCING ONE OR MORE COOLING HOLES IN AN AIRFOIL FOR A GAS TURBINE ENGINE

(71) Applicant: General Electric Company, Schenectady, NY (US)

(72) Inventors: Ariel Caesar Prepena Jacala, Travelers Rest, SC (US); Fred Thomas Willett, Jr., Burnt Hills, NY (US)

(73) Assignee: General ELectric Company, Schenectady, NY (US)

( * ) Notice: Subject to any disclaimer, the term of this patent is extended or adjusted under 35 U.S.C. 154(b) by 461 days.

(21) Appl. No.: 14/950,081

(22) Filed: Nov. 24, 2015

(65) Prior Publication Data

US 2017/0145830 A1   May 25, 2017

(51) Int. Cl.
*F01D 5/18* (2006.01)
*F01D 5/22* (2006.01)
*F01D 5/00* (2006.01)

(52) U.S. Cl.
CPC ............... *F01D 5/18* (2013.01); *F01D 5/005* (2013.01); *F01D 5/186* (2013.01); *F01D 5/225* (2013.01); *B23B 2215/81* (2013.01); *F05D 2220/32* (2013.01); *F05D 2230/10* (2013.01); *F05D 2230/11* (2013.01); *F05D 2230/14* (2013.01); *F05D 2230/21* (2013.01); *F05D 2230/80* (2013.01); *F05D 2240/305* (2013.01); *F05D 2240/306* (2013.01); *F05D 2250/52* (2013.01); *F05D 2260/20* (2013.01); *F05D 2260/202* (2013.01)

(58) Field of Classification Search
CPC . F01D 5/18; F01D 5/005; F01D 5/225; F01D 5/186; F05D 2230/80; F05D 2250/52; F05D 2230/14; F05D 2240/306; F05D 2260/202; F05D 2230/21; F05D 2260/20; F05D 2230/10; F05D 2220/32; F05D 2230/11; F05D 2240/305; B23B 2215/81
See application file for complete search history.

(56) References Cited

U.S. PATENT DOCUMENTS

| | | | |
|---|---|---|---|
| 5,117,626 A | 6/1992 | North et al. | |
| 6,499,950 B2 | 12/2002 | Willett et al. | |
| 9,828,859 B2 * | 11/2017 | Yokoyama | F01D 5/20 |
| 2007/0237637 A1 * | 10/2007 | Lee | F01D 5/20 |
| | | | 416/97 R |
| 2014/0255208 A1 * | 9/2014 | Yokoyama | F01D 5/20 |
| | | | 416/97 R |

* cited by examiner

*Primary Examiner* — Ryan J Walters
(74) *Attorney, Agent, or Firm* — Eversheds Sutherland (US) LLP

(57) ABSTRACT

A method for producing one or more cooling holes in an airfoil for a gas turbine engine is disclosed. The method includes casting one or more hole starter bosses on a suction side, a pressure side, or both of the airfoil, drilling the one or more cooling holes into the airfoil by way of the one or more hole starter bosses, and removing the one or more hole starter bosses after drilling the one or more cooling holes into the airfoil.

14 Claims, 6 Drawing Sheets

SYSTEMS AND METHODS FOR PRODUCING ONE OR MORE COOLING HOLES IN AN AIRFOIL FOR A GAS TURBINE ENGINE

FIELD

Embodiments of the disclosure relate generally to gas turbine engines and more particularly relate to systems and methods for producing one or more cooling holes in an airfoil for a gas turbine engine.

BACKGROUND

In some instances, buckets may be cooled with radial holes that exit (or break out) on a surface of the airfoil rather than running the full length of the airfoil and emerging at the tip. Such cooling holes may break out of the airfoil in the shape of a long, narrow, ellipse. It can be very difficult to drill holes into the airfoil at such a shallow angle.

BRIEF DESCRIPTION

Some or all of the above needs and/or problems may be addressed by certain embodiments of the disclosure. According to one embodiment, there is disclosed a method for producing one or more cooling holes in an airfoil for a gas turbine engine. The method may include casting one or more hole starter bosses on a suction side, a pressure side, or both of the airfoil, drilling the one or more cooling holes into the airfoil by way of the one or more hole starter bosses, and removing the one or more hole starter bosses after drilling the one or more cooling holes into the airfoil.

According to another embodiment, there is disclosed an airfoil for a gas turbine engine. The airfoil may include a suction side, a pressure side opposite the suction side, and one or more hole starter bosses cast on the suction side, the pressure side, or both.

Further, according to another embodiment, there is disclosed a method for producing one or more cooling holes in an airfoil for a gas turbine engine. The method may include casting one or more hole starter bosses on a suction side, a pressure side, or both of the airfoil, drilling one or more line-of-sight access holes in a shroud of the airfoil to provide access to the one or more hole starter bosses, drilling the one or more cooling holes into the airfoil by way of the one or more hole starter bosses, and grinding the one or more hole starter bosses after drilling the one or more cooling holes into the airfoil.

Other embodiments, aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION

Figure 1:
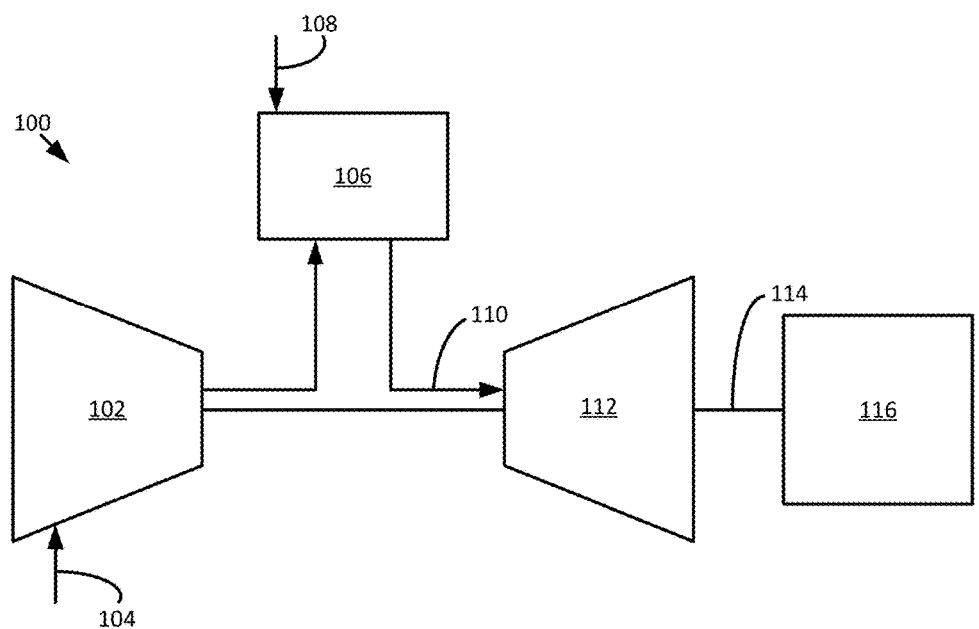
FIG. 1 schematically depicts an example view of a gas turbine engine according to an embodiment of the disclosure.

Illustrative embodiments will now be described more fully hereinafter with reference to the accompanying drawings, in which some, but not all embodiments are shown. The disclosure may be embodied in many different forms and should not be construed as limited to the embodiments set forth herein. Like numbers refer to like elements throughout.

Illustrative embodiments of the disclosure are directed to, among other things, systems and methods for producing one or more cooling holes in an airfoil for a gas turbine engine. In some instances, one or more hole starter bosses may be cast on a suction side, a pressure side, or both of the airfoil. Using the hole starter bosses as a guide, the cooling holes may be drilled into the surface of the suction side or the pressure side of the airfoil. The starter bosses may enable a relatively steep drill angle into the surface of the airfoil. After the cooling holes have been drilled into the surface of the airfoil, the hole starter bosses may be removed. For example, the hole starter bosses may be ground off of the surface of the airfoil.

In some instances, a shroud at the tip of the airfoil may prevent adequate access to the hole starter bosses. For example, the shroud may block the drill angle or the line-of-sight of a drill to the hole starter bosses. In such instances, one or more line-of-sight access holes may be drilled or cast into the shroud of the airfoil to provide access to the hole starter bosses. After the cooling holes have been drilled into the surface of the airfoil, the line-of-sight access holes may be filled in. For example, the line-of-sight access holes may be sealed by brazing, plugging, welding, or covered with a plate that may be brazed or welded in place. The cover could be on either the flowpath side or the seal side of the shroud and could be recessed so as to create a smooth surface. Other means of closing the line-of-sight access holes may also be used. In some instances, the line-of-sight access holes may be left open.

In addition, one or more holes may be drilled into a shank of the airfoil. In this manner, the cooling holes drilled into the surface of the airfoil may meet with the holes drilled up from the shank so that the cooling holes are in fluid communication with the holes in the shank of the airfoil. Accordingly, cooling air may flow from the holes in the shank of the airfoil, through the cooling holes, and out of the surface of the suction side and/or the pressure side of the airfoil.

In certain embodiments, the hole starter bosses may include a protrusion projecting from the surface of the suction side and/or the pressure side of the airfoil. In other instances, the hole starter bosses may include an indentation on the surface of the suction side and/or the pressure side of the airfoil. The hole starter bosses may include a single hole or a number of holes. The holes can be round or other producible shapes. The hole starter bosses, whether a protrusion or an indentation, may be cast on the surface the airfoil. If an indentation, the hole starter bosses can also be produced by the removal of material using electrical discharge machining or other means.

Turning now to the drawings, FIG. 1 shows a schematic view of gas turbine engine 100 as may be used herein. The gas turbine engine 100 may include a compressor 102. The compressor 102 compresses an incoming flow of air 104. The compressor 102 delivers the compressed flow of air 104 to a combustor 106. The combustor 106 mixes the compressed flow of air 104 with a compressed flow of fuel 108 and ignites the mixture to create a flow of combustion gases 110. Although only a single combustor 106 is shown, the gas turbine engine 100 may include any number of combustors 106. The flow of combustion gases 110 is in turn delivered to a downstream turbine 112. The flow of combustion gases 110 drives the turbine 112 to produce mechanical work. The mechanical work produced in the turbine 112 drives the compressor 102 via a shaft 114 and an external load 116, such as an electrical generator or the like.

The gas turbine engine 100 may use natural gas, various types of syngas, and/or other types of fuels. The gas turbine engine 100 may be anyone of a number of different gas turbine engines such as those offered by General Electric Company of Schenectady, New York and the like. The gas turbine engine 100 may have different configurations and may use other types of components. Other types of gas turbine engines also may be used herein. Multiple gas turbine engines, other types of turbines, and other types of power generation equipment also may be used herein together.

Figure 2:
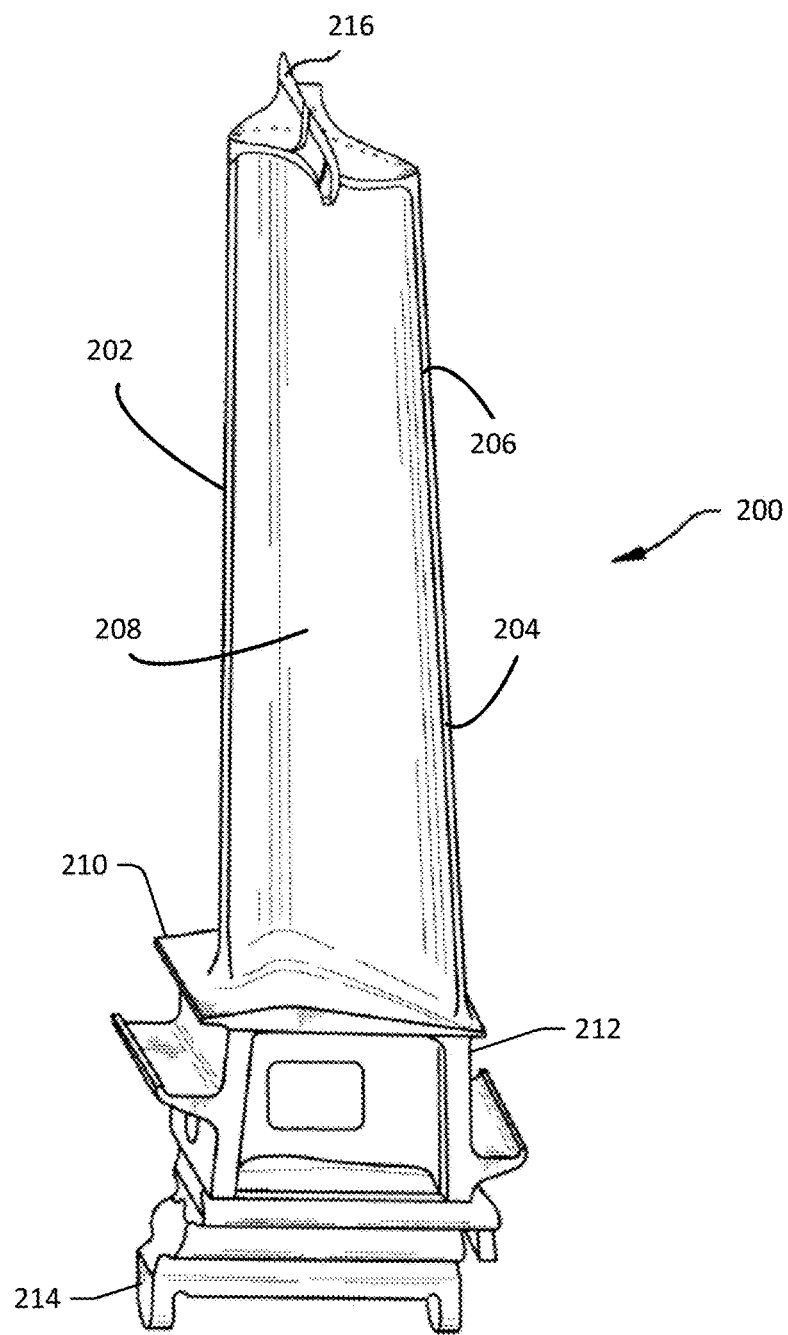
FIG. 2 schematically depicts an example airfoil according to an embodiment of the disclosure.

FIG. 2 schematically depicts one example embodiment of an airfoil 200 that may be used in the compressor 102 or the turbine 112 of FIG. 1. The airfoil 200 may include a leading edge 202, a trailing edge 204, a suction side 206 defined between the leading edge 202 and the trailing edge 204, and a pressure side 208 defined between the leading edge 202 and the trailing edge 204 opposite the suction side 206. The airfoil 200 may include a platform 210, a shank 212, a dovetail 214, and a tip shroud 216.

Figure 3:
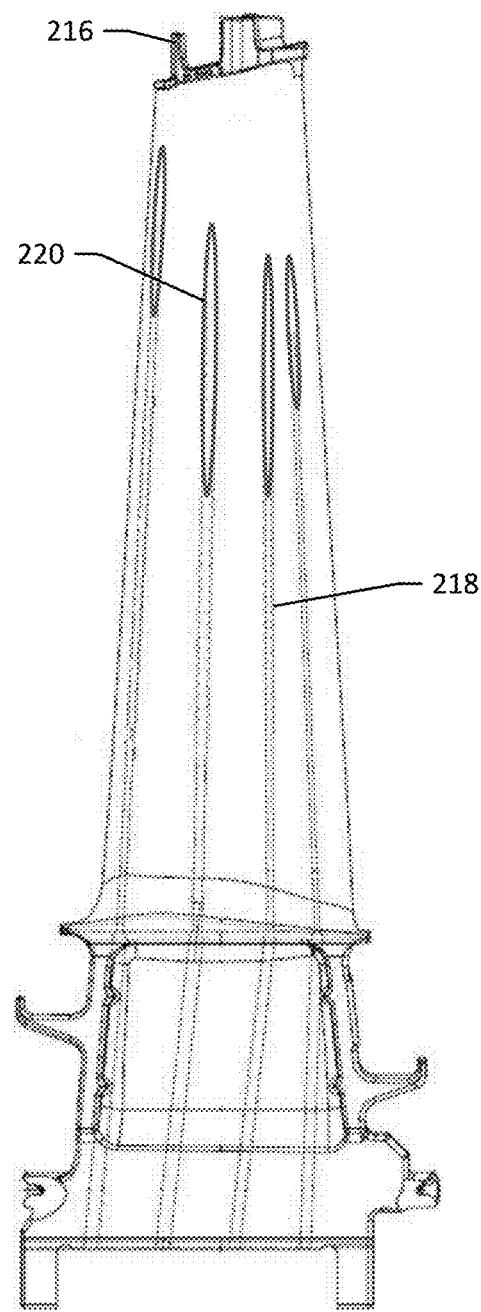
FIG. 3 schematically depicts an example airfoil according to an embodiment of the disclosure.

As depicted in FIG. 3, the airfoil 200 may include a number of cooling holes 218 that exit (or break out) of the airfoil 200 in the shape of a long, narrow, ellipse 220 on the surface of the suction side 206 and/or the pressure side 208. The cooling holes 218 may be drilled using the Shaped Tube Electrochemical Machining (STEM) process. The angle of the cooling holes 218 relative to the surface of the airfoil 200 can make it very difficult to drill the cooling holes 218 into the airfoil 200 at such a shallow angle.

Figure 4:
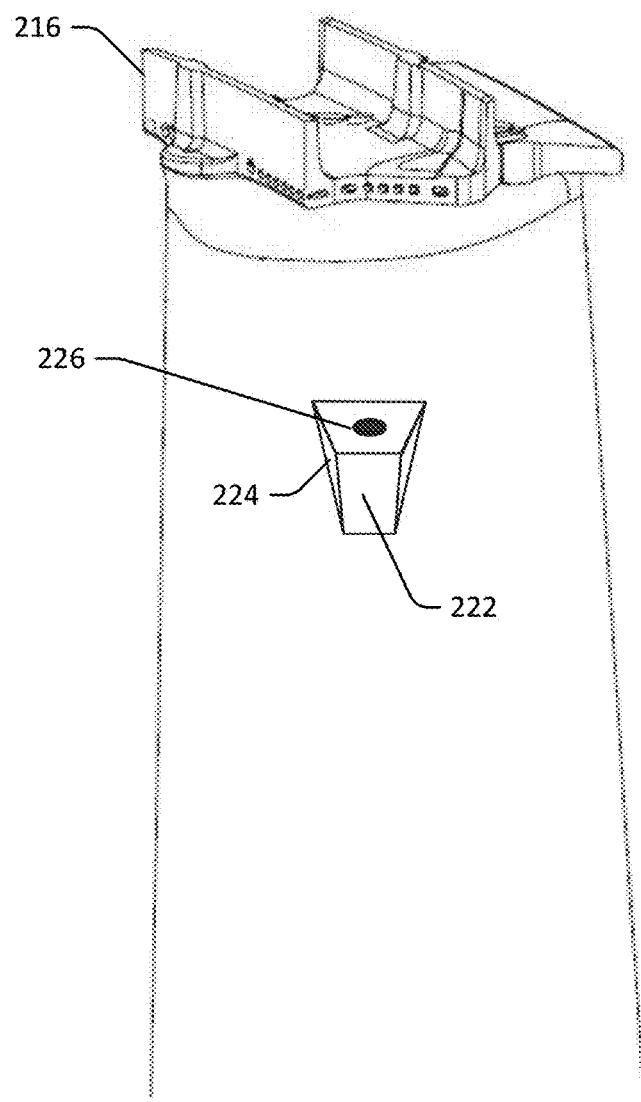
FIG. 4 schematically depicts an example airfoil according to an embodiment of the disclosure.

As depicted in FIG. 4, one or more hole starter bosses 222 may be cast on the suction side 206 and/or the pressure side 208 of the airfoil 200 to enable the production of the radial cooling holes 218 that break through the airfoil surface on the suction side 206 and/or the pressure side 208. Using the hole starter bosses 222 as a guide, the cooling holes 218 may be drilled into the surface of the airfoil 200. In this manner, the starter bosses 222 may enable a relatively step drill angle into the surface of the airfoil 200. After the cooling holes 218 have been drilled into the surface of the airfoil 200, the hole starter bosses 222 may be removed. For example, the hole starter bosses 222 may be ground off of the surface of the suction side 206 and/or the pressure side 208 of the airfoil 200.

In certain embodiments, the hole starter bosses 222 may include a protrusion 224 projecting from the surface of the suction side 206 and/or the pressure side 208 of the airfoil 200. In other instances, the hole starter bosses 222 may include an indentation on the surface of the suction side 206 and/or the pressure side 208 of the airfoil 200. The hole starter bosses 222 may include a single hole 226 or a number of holes. The holes 226 may act as drill guides. The holes 226 can be round or other producible shapes. The hole starter bosses 222, whether a protrusion 224 or an indentation, may be cast on the surface of the suction side 206 and/or the pressure side 208 of the airfoil 200. If an indentation, the hole starter bosses 222 can also be produced by the removal of material using electrical discharge machining or other means.

Figure 5:
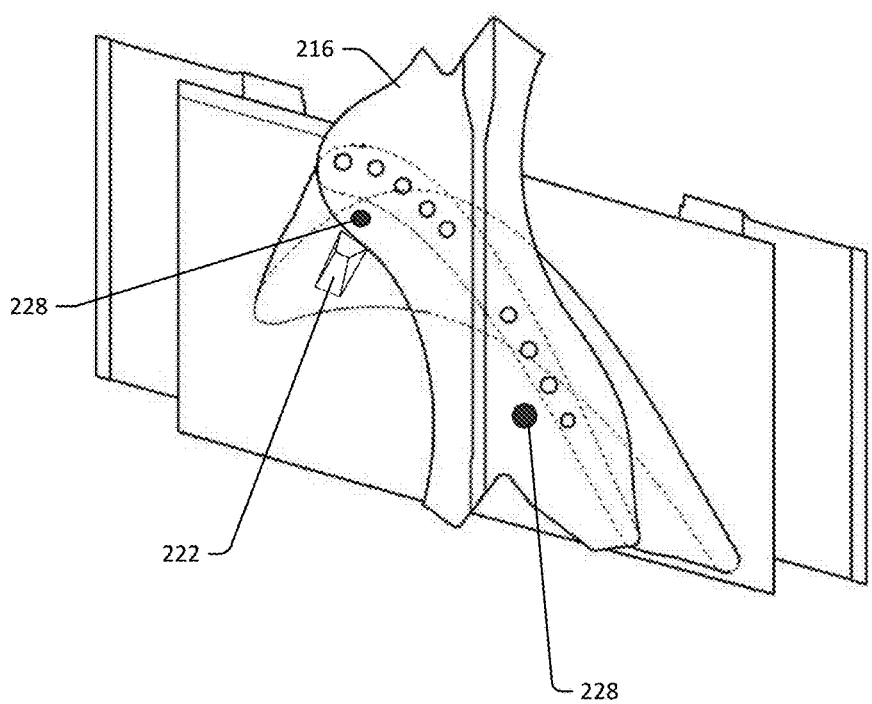
FIG. 5 schematically depicts an example airfoil according to an embodiment of the disclosure.

In some instances, the shroud 216 at the tip of the airfoil 200 may prevent adequate access to the hole starter bosses 222. For example, the shroud 216 may block the drill angle or the line-of-sight of a drill to the hole starter bosses 222. In such instances, as depicted in FIG. 5, one or more line-of-sight access holes 228 may be drilled or cast into the shroud 216 of the airfoil 200 to provide access to the hole starter bosses 222. After the cooling holes 218 have been drilled into the surface of the airfoil 200, the line-of-sight access holes 228 may be filled in. For example, the line-of-sight access holes 228 may be sealed by brazing, plugging, welding, or covered with a plate that may be brazed or welded in place. The cover could be on either the flowpath side or the seal side of the shroud 216 and could be recessed so as to create a smooth surface. Other means of closing the line-of-sight access holes 228 may also be used. In some instances, the line-of-sight access holes 228 may be left open.

Figure 6:
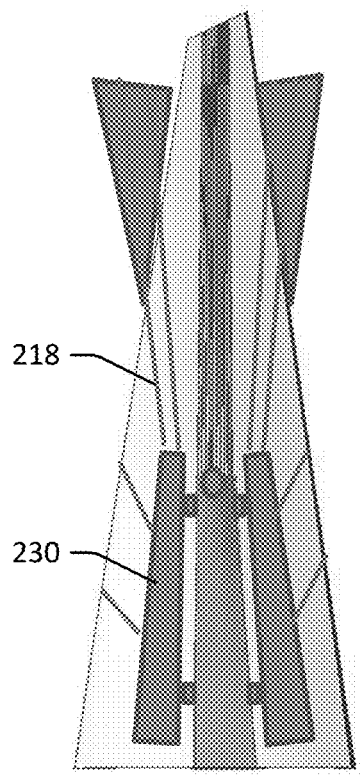
FIG. 6 schematically depicts an example airfoil according to an embodiment of the disclosure.

In addition, as depicted in FIG. 6, one or more holes 230 may be drilled into the shank 212 of the airfoil 200. In this manner, the cooling holes 218 drilled into the surface of the suction side 206 and/or the pressure side 208 of the airfoil 200 may meet with the holes 230 drilled up from the shank 212 so that the cooling holes 218 are in fluid communication with the holes 230 in the shank 212 of the airfoil 200. Accordingly, cooling air may flow from the holes 230 in the shank 212 of the airfoil 200, through the cooling holes 218, and out of the surface of the suction side 206 and/or the pressure side 208 of the airfoil 200.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed is:

1. A method for producing one or more cooling holes in an airfoil for a gas turbine engine, the method comprising:
   casting one or more hole starter bosses on a suction side, a pressure side, or both of the airfoil;
   drilling the one or more cooling holes into the airfoil by way of the one or more hole starter bosses; and
   removing the one or more hole starter bosses after drilling the one or more cooling holes into the airfoil.

2. The method of claim 1, further comprising drilling one or more line-of-sight access holes in a shroud of the airfoil to provide access to the one or more hole starter bosses.

3. The method of claim 2, further comprising filling in the one or more line-of-sight access holes in the shroud of the airfoil after drilling the one or more cooling holes into the airfoil.

4. The method of claim 1, further comprising drilling one or more holes into a shank of the airfoil, wherein the one or more cooling holes are in fluid communication with the one or more holes in the shank of the airfoil.

5. The method of claim 1, wherein the one or more hole starter bosses comprise a protrusion.

6. The method of claim 1, wherein the one or more hole starter bosses comprise an indentation.

7. The method of claim 1, wherein the one or more hole starter bosses comprise a plurality of holes.

8. The method of claim 1, wherein the one or more hole starter bosses are removed by grinding.

9. A method for producing one or more cooling holes in an airfoil for a gas turbine engine, the method comprising:
   casting one or more hole starter bosses on a suction side, a pressure side, or both of the airfoil;
   drilling one or more line-of-sight access holes in a shroud of the airfoil to provide access to the one or more hole starter bosses;
   drilling the one or more cooling holes into the airfoil by way of the one or more hole starter bosses; and
   grinding the one or more hole starter bosses after drilling the one or more cooling holes into the airfoil.

10. The method of claim 9, further comprising filling in the one or more line-of-sight access holes in the shroud of the airfoil after drilling the one or more cooling holes into the airfoil.

11. The method of claim 9, further comprising drilling one or more holes into a shank portion of the airfoil, wherein the one or more cooling holes are in fluid communication with the one or more holes in the shank portion of the airfoil.

12. The method of claim 9, wherein the one or more hole starter bosses comprise a protrusion.

13. The method of claim 9, wherein the one or more hole starter bosses comprise an indentation.

14. The method of claim 9, wherein the one or more hole starter bosses comprise a plurality of holes.

* * * * *